United States Patent
Cloutier et al.

(10) Patent No.: US 8,277,280 B2
(45) Date of Patent: Oct. 2, 2012

(54) HONING FEED SYSTEM AND METHOD EMPLOYING RAPID TOOL ADVANCEMENT AND FEED FORCE SIGNAL CONDITIONING

(75) Inventors: Daniel R. Cloutier, Clive, IA (US); Timothy P. Hoth, St. Peters, MO (US); Russell L. Jacobsmeyer, Labadie, MO (US); Michael J. Nikrant, Columbia, IL (US)

(73) Assignee: Sunnen Products Company, St. Louis, MO (US)

( * ) Notice: Subject to any disclaimer, the term of this patent is extended or adjusted under 35 U.S.C. 154(b) by 460 days.

(21) Appl. No.: 12/542,597

(22) Filed: Aug. 17, 2009

(65) Prior Publication Data

US 2010/0029179 A1 Feb. 4, 2010

Related U.S. Application Data

(60) Continuation-in-part of application No. 12/119,145, filed on May 12, 2008, now Pat. No. 7,575,502, which is a division of application No. 11/596,836, filed on Nov. 17, 2006, now Pat. No. 7,371,149.

(60) Provisional application No. 60/607,742, filed on Sep. 7, 2004.

(51) Int. Cl.
*B24B 49/00* (2012.01)
*B24B 51/00* (2006.01)

(52) U.S. Cl. ............. 451/5; 451/11; 451/27; 451/51; 451/61; 451/119; 451/127

(58) Field of Classification Search ............ 29/563, 29/888.07; 451/5, 11, 27, 51, 61, 76, 108, 451/119, 124, 127; 700/164, 172, 174, 181; 318/603
See application file for complete search history.

(56) References Cited

U.S. PATENT DOCUMENTS

| | | | |
|---|---|---|---|
| 3,032,932 A * | 5/1962 | Bargren | 451/124 |
| 3,410,028 A * | 11/1968 | Estabrook | 451/1 |
| 3,849,940 A | 11/1974 | Yoshino et al. | |
| 4,187,644 A | 2/1980 | Fitzpatrick | |
| 4,397,658 A | 8/1983 | Vanderwal, Jr. | |
| 4,455,789 A | 6/1984 | Gehring | |
| 4,463,490 A * | 8/1984 | Saito et al. | 29/566.1 |
| 4,679,357 A | 7/1987 | Richter et al. | |
| 4,823,061 A | 4/1989 | Boulton et al. | |
| 4,887,221 A | 12/1989 | Davis et al. | |
| 5,042,202 A * | 8/1991 | Klein et al. | 451/124 |
| 5,095,662 A | 3/1992 | Grimm et al. | |
| 6,920,678 B2 | 7/2005 | Ooe et al. | |
| 7,189,143 B2 * | 3/2007 | Klein | 451/11 |
| 7,371,149 B2 * | 5/2008 | Cloutier et al. | 451/5 |
| 7,575,502 B2 * | 8/2009 | Cloutier et al. | 451/5 |
| 7,727,051 B2 * | 6/2010 | Martin et al. | 451/11 |
| 8,096,853 B2 * | 1/2012 | Moehn et al. | 451/11 |

FOREIGN PATENT DOCUMENTS

| EP | 0081383 | 6/1983 |
|---|---|---|
| EP | 0575675 | 12/1993 |

* cited by examiner

*Primary Examiner* — Timothy V Eley
(74) *Attorney, Agent, or Firm* — Matthews Edwards LLC

(57) ABSTRACT

The honing feed system and method utilizes feedback from various sources during rapid feeding of the honing tool while rotating and stroking, to detect initial contact with a bore surface, to slow the feed to a normal honing rate, involving conditioning the feedback signals to eliminate noise factors such as the stroking movement and forces generated to rotate and feed the tool unopposed.

21 Claims, 12 Drawing Sheets

HONING FEED SYSTEM AND METHOD EMPLOYING RAPID TOOL ADVANCEMENT AND FEED FORCE SIGNAL CONDITIONING

This application is a continuation-in-part of patent application Ser. No. 12/119,145, filed May 12, 2008 now U.S. Pat. No. 7,575,502, which application is a division of patent application Ser. No. 11/596,836, filed Nov. 17, 2006, now U.S. Pat. No. 7,371,149, issued May 13, 2008, and also claims the benefit of U.S. Provisional Application No. 60/607,742, filed Sep. 7, 2004.

TECHNICAL FIELD

The present invention is directed to a honing feed system and method, and more particularly, which utilizes feedback from various sources to control the feed including to condition the feedback signals to determine precisely the occurrence of contact between the honing tool and workpiece or bore surface, including with the tool rotating at full honing speeds and stroking.

BACKGROUND ART

Existing honing machines normally control the beginning of the honing cycle wherein the feed system is rapidly expanding the tool to a specific feed position. If the system expands the tool too far or too fast it risks the chance that the abrasive will impact the workpiece or bore surface with too much force and thus damage the tool and/or fixture. If the system doesn't expand the tool far enough such that the abrasive does not touch the bore surface, or if it expands too slowly, then the machine will hone air and unnecessarily increase the honing cycle time.

A common known compromise to this challenge of balancing the maximum starting feed position, and feed rate at the beginning of the honing cycle is to rapidly expand the tool to some known position less than the minimum expected location of the bore surface. One basic disadvantage of this method comes up if the starting diameter of the un-honed work piece varies from work piece to work piece. Under these conditions the system could still waste cycle time by honing air between the positions that the tool had rapidly expanded out to, to the actual position of the bore wall.

Reference in regard to known feed systems, U.S. Pat. No. 3,849,940 (Yoshino et al., Honing Machine) which describes a feed system that contains both a constant force and a constant rate system mechanically coupled in such a way that the faster of the two systems will control the expansion of the honing stones. However, if the constant rate system is in control, then there is no means to measure feed force or to correct bore errors caused by variances in feed force. Also, it is not possible to select the slower system when it is desirable to do so, e.g. to improve bore geometry at the end of the honing cycle.

U.S. Pat. No. 4,187,644 (Fitzpatrick, Dual Feed Apparatus for Multiple Spindle Honing Machine) describes a feed system where a cylinder (constant force system) expands stones to the point where they contact the workpiece bore and then the feed control switches to a constant rate mechanism. However, this system includes no means to measure feed force or to correct bore errors caused by variances in feed force. Also, it is not possible to select the controlled force system other than for the initial rapid expansion of the stones.

U.S. Pat. No. 4,397,658 (Vanderwal, Feed Control For Honing or Like Machines) describes an oil damper device to provide a slower initial feed rate or even a constant feed rate for the entire honing cycle. However, this includes no means to measure feed force or to correct bore errors caused by variances in feed force.

U.S. Pat. No. 4,679,357 (Richter et al., Method and Apparatus for Displacing a Honing Tool) describes a feed system where a low value torque limit is imposed on a feed motor control so that stones may feed initially very fast up to the point of contact with the bore, and thereafter a higher torque limit is allowed for honing. The torque limit of the motor is roughly equivalent to a limit on feed force, although mechanical inefficiencies limit the accuracy of using of torque limits as feed force limits. This system also does not include a means to measure feed force or to correct bore errors caused by variances in feed force. There also appears to be no means to control the honing feed to a desired feed force apart from merely preventing the force from exceeding some limit.

European Pat. No. 0081383 (Fox, Improvements Related to Honing) claims a control system that uses feedback from a means for monitoring feed position and velocity and a means for monitoring feed force. However, the details of the patent describe only a hydraulic feed system with a position encoder. In such a system, feed force is inferred by measurement of hydraulic pressure and subject to errors such as that induced from frictional forces between the hydraulic piston and its bore. Although the patent refers to means for monitoring force and position, the use of an electronic load cell to directly measure feed force is not mentioned.

European Pat. No. EP 0 575 675 B1 (Grimm, et al, Method and Machine for Finishing a Bore in a Work Piece) uses a feed force measuring device but only for the purpose of determining the target end point (final encoder position) for the honing process by expanding the honing tool into a size-calibrated ring with a feed force equivalent to that measured on the previously finished workpiece. In a limited way this compensates for errors caused by the elasticity of the workpiece and the feed system components, but as the compensation is a static correction based on force measurements in the previous workpiece, it describes no means to dynamically correct for variations encountered with the workpiece currently being honed. It relies on the assumption that every workpiece is virtually identical to the previous workpiece in regards to hardness and the amount of material to be removed. However, in most applications, this assumption cannot be made reliably. Also, this method makes no suggestion that honing feed force can be controlled throughout the honing cycle.

What is generally sought therefore, is to determine and utilize a set of conditions that will optimize the cutting action of a honing tool, particularly the abrasive element or elements thereof, e.g., the honing stone or stones. Specifically, it is desired to optimize the attritive, chemical, and fracture wear process in honing such that the abrasive grit size, concentration, and type, in concert with morphology of the carrier material as a function of material removed, can be adjusted. It is further sought to provide a capability for dressing of the abrasive surface in a manner that assures a repeatable initial condition of the abrasive as a honing cycle commences. To achieve these, what is further sought is a system and method of rapidly advancing the honing tool such the abrasives of the honing tool make contact with the bore surface at a fast rate, without risking damage to the tool, workpiece, honing machine, or operator, while still maintaining bore geometry.

SUMMARY OF THE INVENTION

What is disclosed is a honing feed system and method of rapidly advancing a honing tool such the abrasives makes contact with the bore surface at a fast rate, without risking damage to the tool, workpiece, honing machine, or operator, while still maintaining bore geometry, so as to achieve at least one of the objectives sought above. In particular, the system and method of the invention provide a set of conditions that will optimize the cutting action of a honing element of a tool, namely, the attritive, chemical, and fracture wear properties thereof, such that the abrasive grit size, concentration, and type in concert with morphology of the carrier material as a function of material removed can be adjusted or selected. Further, the invention allows for dressing of the abrasive surface of a honing tool in a manner that assures a repeatable initial condition of the abrasive as a honing cycle commences.

According to a preferred aspect of the invention, a basic honing machine will include a honing tool supported on a spindle rotatable by a spindle drive (also referred to as the "spindle axis") including a spindle motor; a stroking drive (also referred to as the "stroking axis") operable for relatively stroking a stroking carriage carrying a column including the honing tool along the axis of rotation thereof; and a feed system operable for radially expanding and retracting the honing or abrasive element or elements of the tool (also referred to as the "feed axis"). Alternatively, the workpiece can be rotated and/or stroked relative to the honing tool. The feed axis generally includes a rod or other feed element that is pushed (or pulled) by a lead screw or ball screw driven by a feed motor or other driver, for controlling expansion of the abrasive honing elements, and a device for determining a position of the feed element, such as an encoder. A gear reducer, or other mechanism and/or control, may be coupled with the motor or other driver to achieve the torque, speed, and position resolution required by the system specifications.

According to another preferred aspect of the invention, feedback from one or more sources is used to control the feed system to determine precisely when the abrasive has made contact with the workpiece bore surface. Unlike other bore finding techniques where the spindle rotation must be completely stopped while the system rapidly expands the tool, the present invention allows the honing tool to be rotating at full operational speed thus eliminating unnecessary and possibly costly time in the machine's overall honing cycle. As a result, the system and method of the invention has wide application for many types of honing tools and to improve productivity of many honing applications.

Rapid Until Load

According to another preferred aspect of the invention, the feed system is configured to utilize a rapid advance method ("Rapid Until Load" or "RUL") which automatically feeds back into the feed control circuit the generated torque from the spindle motor which provides the angular movement or rotation of the tool. In this method, the feed system monitors the spindle torque or "load" from the drive system that supplies power to the spindle motor. A reference torque is computed that represents the unloaded tool. The system then continuously and automatically monitors this torque, and compares it to the reference torque and a target torque (or the RUL "Rapid Until Load" force) as it rapidly expands the tool at a predetermined rate. The RUL torque is the level of torque allowed before the system reduces the feed rate down to the normal honing feed rate. This torque denotes where the start of contact with the bore wall or surface is made. The system controls the rate of expansion based on the generated torque applied to the tool. As such, the system is providing a "Rapid Until Load" type method of advancing the tool at the start of the honing cycle.

To improve on the RUL method the controls can be located internal to the feed system such that the generated torque from the spindle drive is fed directly into the controls of the feed system. This is advantageous as it improves the response time of the feed system so as to react as fast as possible to changes in the applied torque. This has been found most useful when using small diameter tools.

Another improvement of this method is to allow for various sensitivity sensing. That is, smaller tools may require lower applied torque to the tool. Such that, as a means to maintain the same performance and sensitivity when rapidly advancing the tool, regardless of the size of the tool, the resolution of the feedback signal may have to be increased, and thus the upper range decreased, for smaller tools compared to honing with much larger tools.

A second method of improvement is to utilize a toque sensor in the feedback to the feed control circuit rather than the output torque signal from the spindle drive. The torque sensor can be attached or disposed such that it is sensing the actual torque on the tool or it could even be attached to the apparatus or fixture holding the workpiece. Other locations in the feed system could also be used to monitor the torque.

Rapid Until Force

According to another aspect of the invention, a rapid advance method of starting the feed system monitors the applied feed force on the bore surface rather than the applied torque. Monitoring the applied force can be an improvement over the RUL method as it involves using a more direct means of feedback from the honing tool. The RUL method monitors the rotational force generated on the tool. This proposed method ("Rapid Until Force" or "RUF"), automatically monitors the linear force applied to the abrasive honing element or elements. A load cell, or some other transducer or manner of directly measuring the feed rod force, can be utilized, such as, but not limited to, by attachment to the feed mechanism, to provide a direct means of measuring the linear force applied to the abrasive element or elements.

One of the advantages of the RUF method over the RUL method is that linear force measured is directly proportional to the actual force applied to the abrasive element or elements. In the RUL method of rapid feed expansion, the torque measured may not only be the torque necessary to rotate the tool while it hones the workpiece bore surface, but also the required torque just to move the spindle axis itself. One important aspect of the rapid advance method is to be able to differentiate between the two. Also, inherent to any motor, the actual required torque to rotate the spindle motor will vary over time. This makes it very difficult to know if any variance in the measured torque is due to this normal power fluctuation or due to actual torque required to hone the workpiece.

The RUF method has been found to eliminate this concern. Based on the location of the transducer, for example, but not limited to, a load cell attached in line with the wedge used to drive the abrasive element or elements, the linear force measured by this transducer will be directly proportional to the applied force on the abrasive. This method has been found to provide a much higher degree of sensitivity such that the system can respond to any changes in the applied force much faster than it could with the RUL method. Faster response provides greater accuracy and repeatability of the system determining when to transition from the rapid feed rate to the normal honing feed rate. Accurately determining when this transition should take place all but eliminates occurrence of honing air. It does this by forcing the abrasives against the bore surface as fast as possible without risk to the tool, fixturing, or workpiece.

The ability to have the system automatically monitor the feedback signal allows for the possibility of the actual force to overshoot the "Target" force. The "Target" force is the transition force point where the system would drop the rapid feed rate down to the normal honing feed rate. That is, by the time the system responds to the applied force reaching the intended "Target" force, the actual applied force may have increased a little more. The amount of overshoot would be based on the rapid feed rate and the system response time.

According to another preferred aspect of the invention, an improvement to the RUF method would be to feed the linear transducer signal directly back into the feed drive. This would eliminate the need to have the system monitor the feed force thus removing the slow response of the system to changes in the feed force. The circuit in the feed drive would allow the applied feed force to be continuously monitored and controlled by immediately reacting to any changes in the feed force. This almost instantaneous response has been found to provide an extremely high degree of accuracy and repeatability in the system to transition from the rapid feed rate to the normal honing rate.

Another improvement on this method would be to gradually slow down the feed rate used to get to the load. One of the primary issues in using either of the rapid search methods is that there would be some overshoot in the force when the abrasives actually come in contact with the bore wall. This happens because of the feed rate as well as the response time of the system. If the feed rate would be gradually reduced as the force threshold is reached, then the overshoot would be reduced. This helps with application using smaller tools. The initial spike of load that the tool would see would be reduced and there would be less of a tendency of the tool to break due to the lower applied forces on the tool. This can be applied to both the RUL and the RUF concept.

Signal Conditioning

An important issue for both the RUL and RUF methods has been found to be the conditioning of the signal. Direct measurements of the load (either force or torque) will give better results than using calculations of power or torque generated inside a drive. The signals coming from a drive have some variations that can occur with power variations. Using direct measurements eliminates this issue. However, direct measurements have been found to have a few drawbacks that need to be addressed for these functions to work.

First, because the direct measurement device can be part of a moving mechanism, for example a stroking column or a rotating spindle, the direct measurement can have some extra factors in the signal that need to be filtered out so that the actual signal that the tool is seeing can be truly used. Factors such as feed rod misalignment and inertial loads of the system can cause cyclic oscillations in the signal that, when properly filtered, can be eliminated from the signal. This gives a signal value that can be used to give the load that the tool is actually seeing. In particular with regard to the cyclical force component of the signal value, it has been found that the stroking movement is generating an inertial force on the sensing device that is really not the load that is seen at the abrasive honing element or elements. This force is seen at the same frequency as the stroking speed. To eliminate this signal, it has been found necessary to filter out the fundamental frequency (stroking speed). It has also been found advantageous and possibly necessary to eliminate or reduce the harmonics of the fundamental frequency, in particular, the second and third harmonic frequency, to achieve a smooth signal. This is preferably done using a $4^{th}$ or a $6^{th}$ order notch filter to eliminate these frequencies. Further in this regard, it has been found that when the stroke is slow, as a general rule, only the $4^{th}$ order notch filter is used because if the $6^{th}$ order notch filter is used, there can be considerable lag in the system.

Second, when direct measurement cannot be made, the signal that is calculated in a drive, for example motor torque, can be used, but typically the signal will have some undesirable components to this signal as well. These components are based upon speed and other factors of the machine that may not be desirable to have, such as the amount of torque that is required just to rotate a spindle. As a result, it has been found that these components are preferably removed before any useful control can be done using these signals. One way of doing this is to guess on the value. Unfortunately, this value can change slightly from cycle to cycle. Another way is to measure this value at the beginning of the honing cycle to determine what the value is in real time, and is preferred. Essentially, during a very brief period of time at the beginning of the cycle, a sample of the filtered load is taken, and the average value that is present just by running the machine is determined. This averaged value is then subtracted from the filtered load as it is just a DC offset. This offset comes from several sources. A few of these sources can be electronic offsets in the measuring devices as well as mechanical misalignments in the system. By subtracting this baseline force, it is found that a much more accurate value is present, and with which the machine can be controlled.

DETAILED DESCRIPTION OF THE INVENTION

Figure 1:
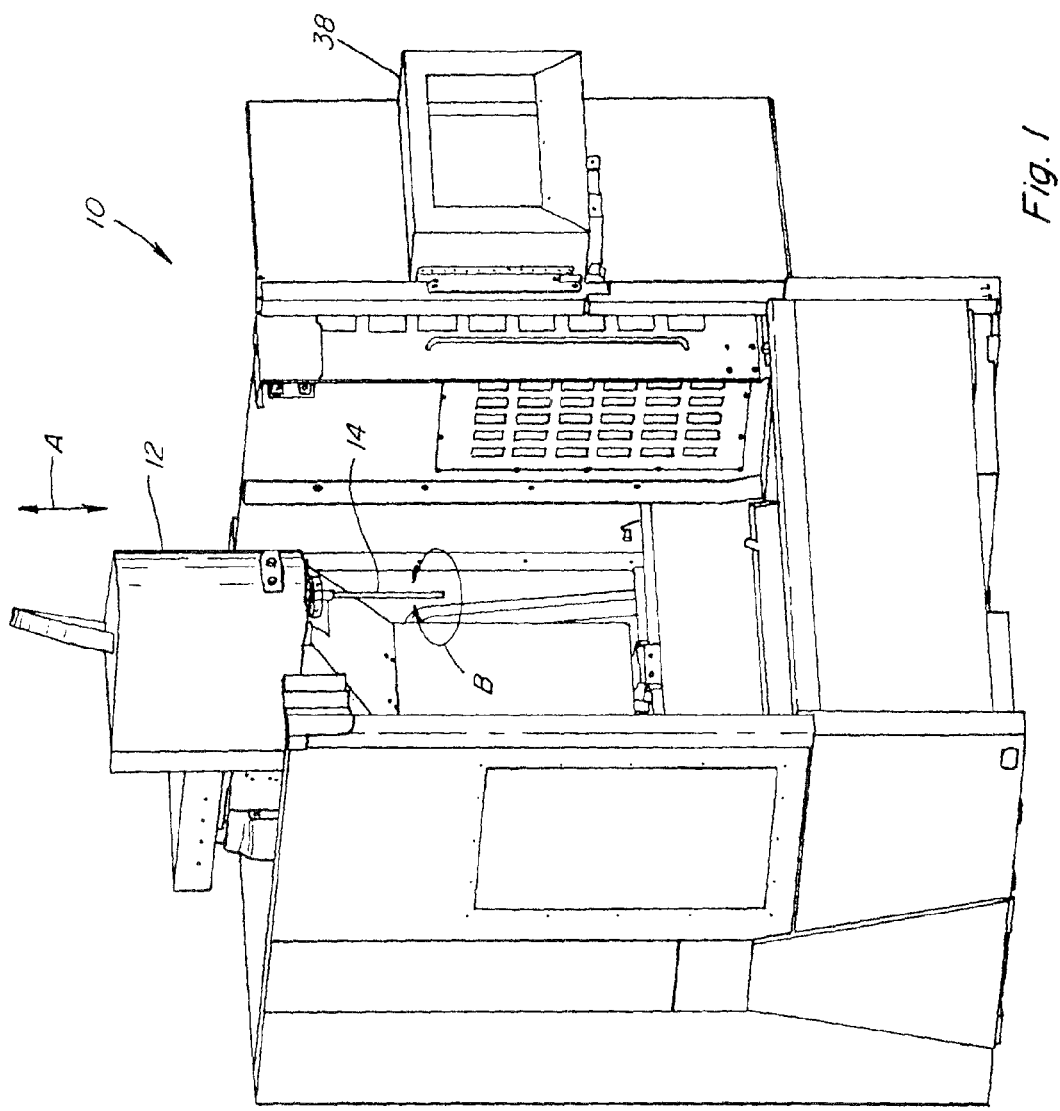
FIG. 1 is a simplified perspective view of a honing machine including a feed system according to the invention.

Referring now to the drawings wherein a preferred embodiment of a feed system and method of operation thereof is shown, in FIG. 1, a representative computer controlled honing machine 10 is shown including aspects of the feed system according to the present invention. Honing machine 10 generally includes a spindle carriage 12 which is movable in a reciprocating stroking action, denoted by arrow A, by a linear motion system such as a conventional motor driven cam linkage mechanism, or a ball screw, roller screw, linear servomotor, rack and pinion, hydraulic cylinder, chain, or belt, under control of a process based main controller 38. Here, carriage 12 is shown supported for reciprocal stroking action in a vertical direction, but it should be understood that stroking in other directions is also contemplated under the present invention. Spindle carriage 12 includes a honing tool 14, which can be of conventional or new construction and operation, generally including an elongate mandrel carrying one or more honing elements such as abrasive stones or sticks which can be moved radially outwardly and inwardly relative to the mandrel, and which abrade and hone a surface of a work piece in which tool 14 is inserted, as tool 14 is rotated, as denoted by arrow B. In a typical application, as spindle carriage 12 is reciprocally stroked upwardly and downwardly, as denoted by arrow A, honing tool 14 will rotate in one direction or the other, as denoted by arrow B, within a hole or bore in a workpiece, for providing a desired size, surface finish and/or shape to one or more surfaces defining the bore or hole.

Figure 2:
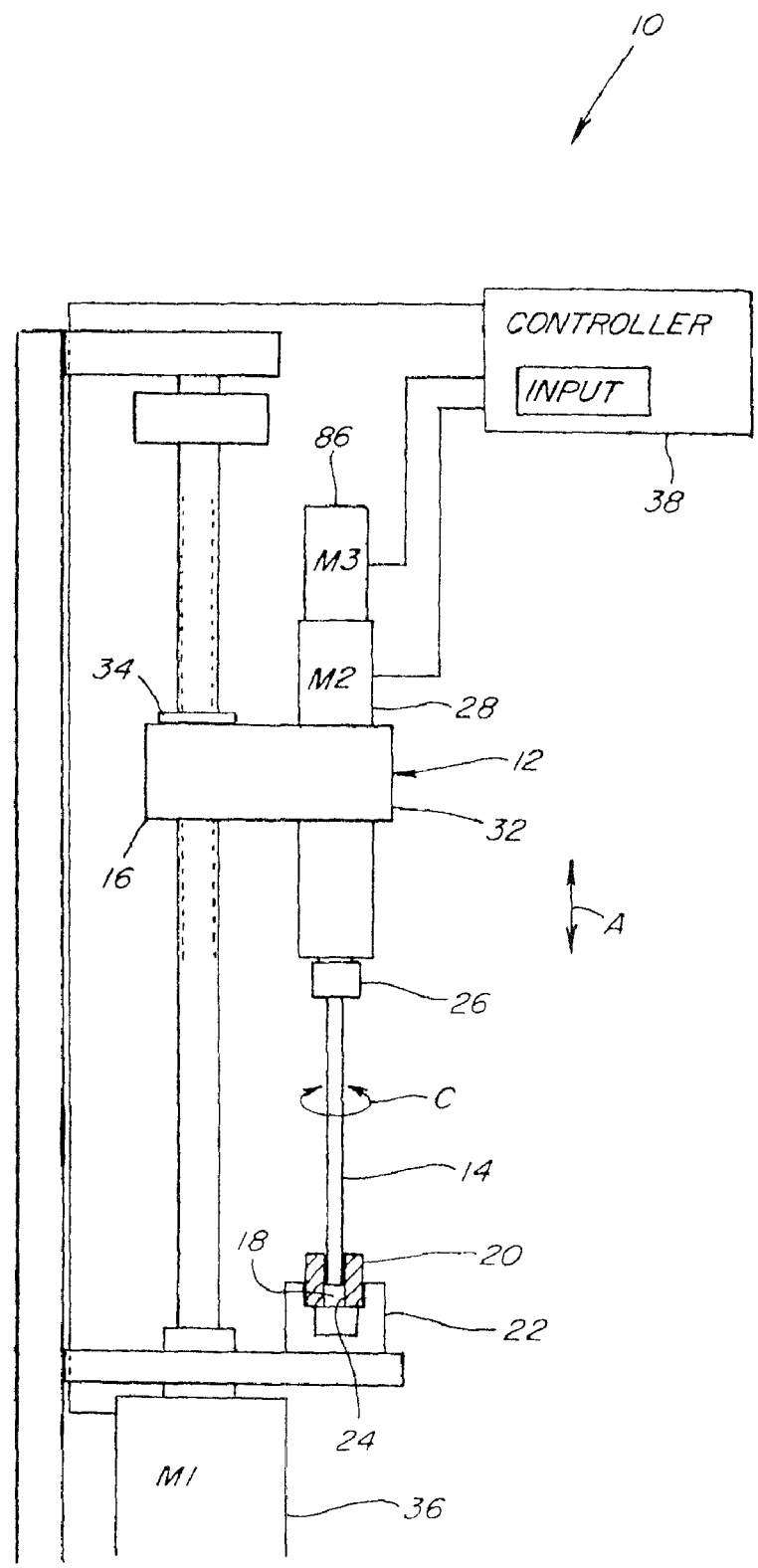
FIG. 2 is a simplified schematic representation of elements of the honing machine of FIG. 1.

Referring also to FIG. 2, a simplified schematic representation of one possible stroking apparatus of honing machine 10 is shown. Here, tool 14 is shown inserted into a bore 18 of a workpiece 20 held in a fixture 22 of machine 10, for honing an internal surface 24 of workpiece 20 defining bore 18. Honing tool 14 is supported by a rotatable spindle 26 for rotation denoted by arrow C, and reciprocal movement denoted by arrow A as effected by a ball screw drive mechanism 16, for effecting desired honing of surface 24 of workpiece 20. Spindle 26 is rotatably driven by a drive 28 in the well known manner. Honing tool 14 is radially expanded and retracted by a feed drive or feed axis 86, under control of a feed system 30 of the invention, as will be explained below. Spindle 26 supporting tool 14, as well as drive 28 and elements of feed axis 86, are supported on a spindle support 32 connected to a ball nut 34 of ball screw 16, so as to be movable longitudinally along ball screw 16 as effected by rotation of a servo motor 36 in connection therewith. Ball screw 16 is precisely rotatable by servo motor 36, the number of rotations of and the rotational position of which being precisely detectable by an encoder or other sensor (not shown). Ball nut 34 is moved longitudinally along ball screw 16 by the rotation thereof, and from the rotation count of ball screw 16 the longitudinal position of ball nut 34 is determined. Servo motor 36 is controllable by a processor based main controller 38 for stroking spindle carriage 12 and honing tool 14, as desired or required for achieving a desired parameter or parameters. Here, it should be noted that it is further envisioned that ball screw 16 could be substituted with any other means of rotary to linear motion conversion (e.g. rack & pinion), or that the motor, encoder and ball screw together could be substituted with a linear motor and linear encoder, or any other system of providing position controlled linear motion.

Figure 3:
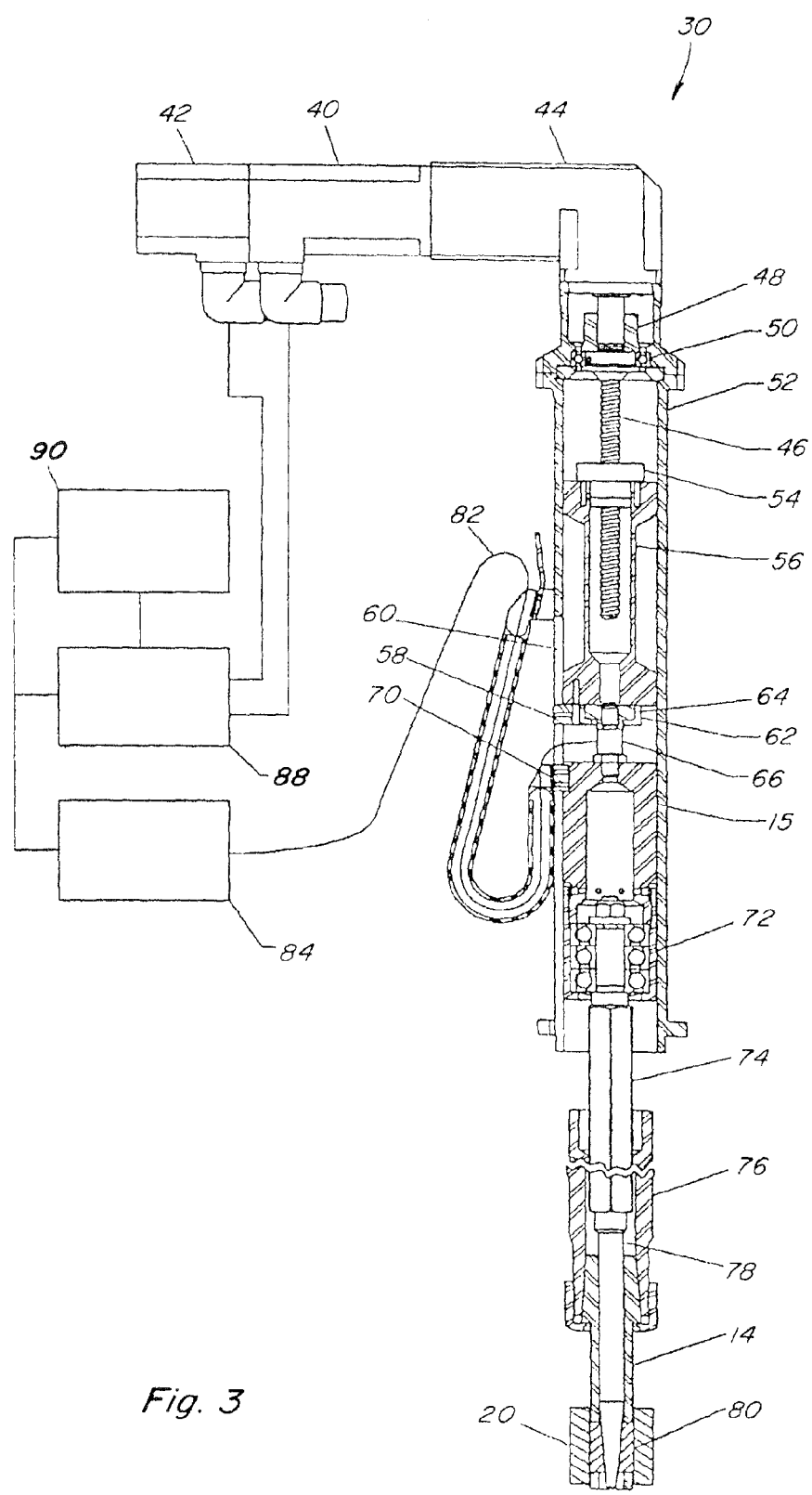
FIG. 3 is a simplified schematic representation of elements of the feed system of the invention.

Turning to feed system 30 of the invention, in FIG. 3, one possible embodiment of a feed axis 86 is shown. A feed motor 40 of axis 86 is connected to (or is integral with) an encoder 42. If needed to provide the desired characteristics of output torque, output speed, and linear travel per encoder count, a gear reducer 44 may be attached to the shaft of the feed motor 40. The gear reducer output shaft is connected to a ball screw assembly 46 by a coupling 48. The ball screw assembly 46 resists axial motion by means of ball bearing 50 held in a feed system housing 52. (The feed system housing 52 may consist of several pieces as required for ease of manufacturing and assembly.) The ball screw engages a ball nut 54 that is attached to a ball nut carrier 56. The ball nut carrier 56 is prevented from rotating by a key 58 that engages a slot 60 in the feed system housing 52. Rotation of the feed motor 40 and subsequently the output shaft of the gear reducer 44 causes the ball screw to rotate, which in turn imparts a linear motion to the ball nut 54 and its carrier 56. The key 58, in this embodiment, is integral with a retainer 62 that has a pocket to hold a round disc 64. The round disc 64 is attached to one threaded end of a transducer, which here is selected to be a load cell 66. The pocket has a very small amount of clearance with the round disc 64 for the purpose of allowing the round disc 64 to align itself with the components below without creating any undesirable stresses on the load cell 66. The load cell 66 is fastened to a non-rotating feed rod 68, which is prevented from rotating by a key 70 which also engages the previously mentioned slot 60 in the feed system housing 52. The non-rotating feed rod 68 is attached to a tube holding an arrangement of angular contact bearings 72. The rotating races of the bearings 72 are attached to a rotating feed rod 74. The rotating feed rod 74 is splined or keyed by some means so that it will rotate with the honing machine spindle shaft 76 and yet allows relative axial motion between the spindle shaft 76 and the feed rod 74. The spindle shaft 76 holds the honing tool 14 which contains a wedge 78 for expanding abrasive honing elements 80 into the bore of the workpiece 20. The wedge 78 is attached to the feed rod 74 and is allowed to move axially with the feed rod 74 while the tool 14 is restrained from axial movement by its connection to the spindle shaft 76. This relative axial motion of wedge 78 and tool 14 creates the expanding/retracting motion of the abrasive honing elements 80. The feed system housing 52 and the spindle shaft 76 are both connected to carriage 12 (FIGS. 1 and 2) that strokes them together to generate the axial reciprocation of the honing process.

Figure 4:
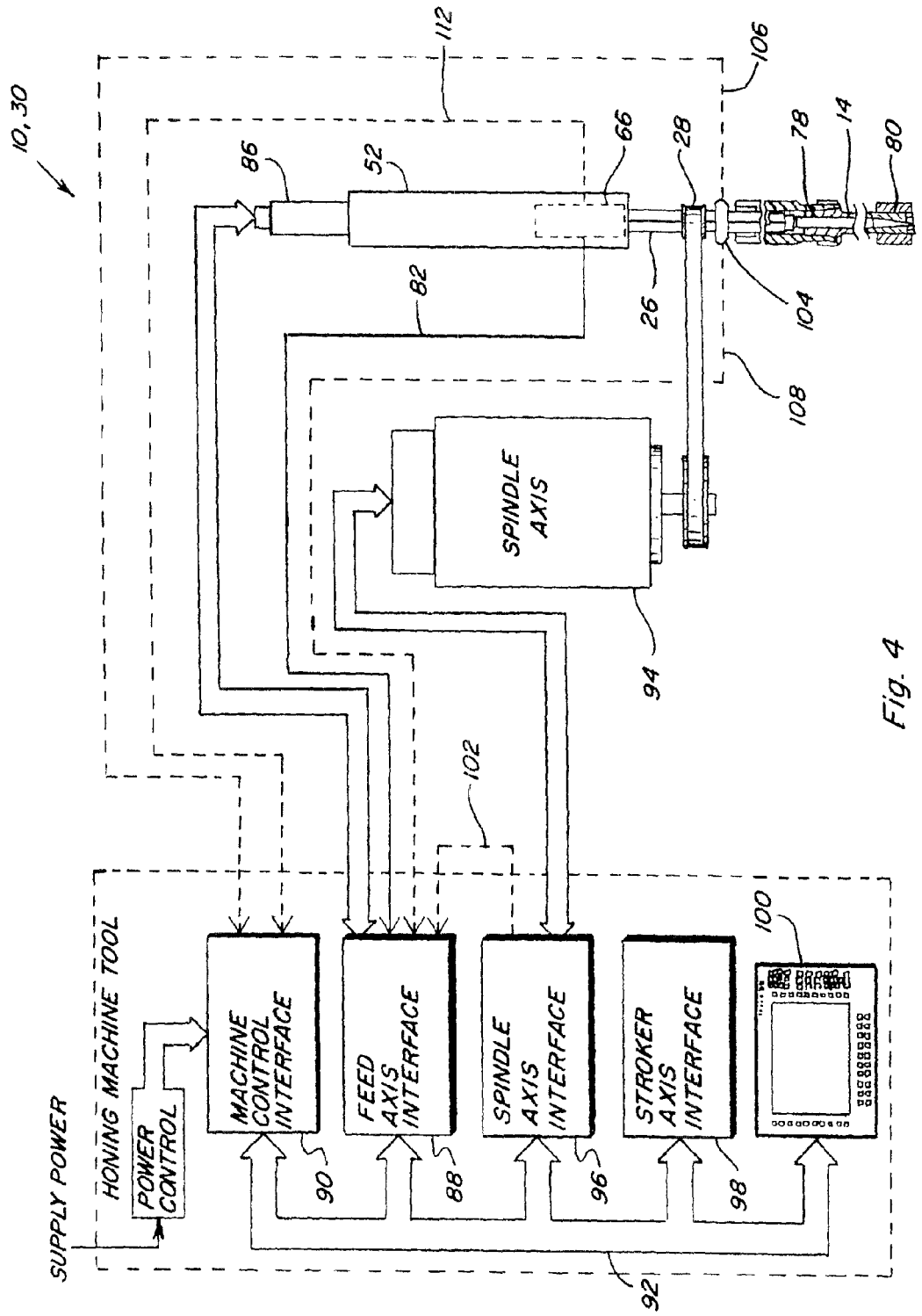
FIG. 4 is a diagrammatic representation of an embodiment of the feed system of the invention.

The axial force of the wedge 78 to expand the honing elements 80 is developed from the torque of the feed motor 40 and converted to a linear force by the ball screw and nut and then transmitted through the load cell 66 to the feed rod 74 and wedge 78. A load cell cable 82 is carried through a cable carrier to a feed axis interface 88 via an amplifier 84 (if required). Power to and signals from the load cell 66 run through this cable 82 and amplifier 84 to a processor based feed axis interface 88 in connection with a machine control interface 90 and other elements of the honing machine tool via a control bus 92, as also shown in FIG. 4. The control of these devices as described in the methods below result in signals that precisely control the motion of the feed motor 40.

Figure 5:
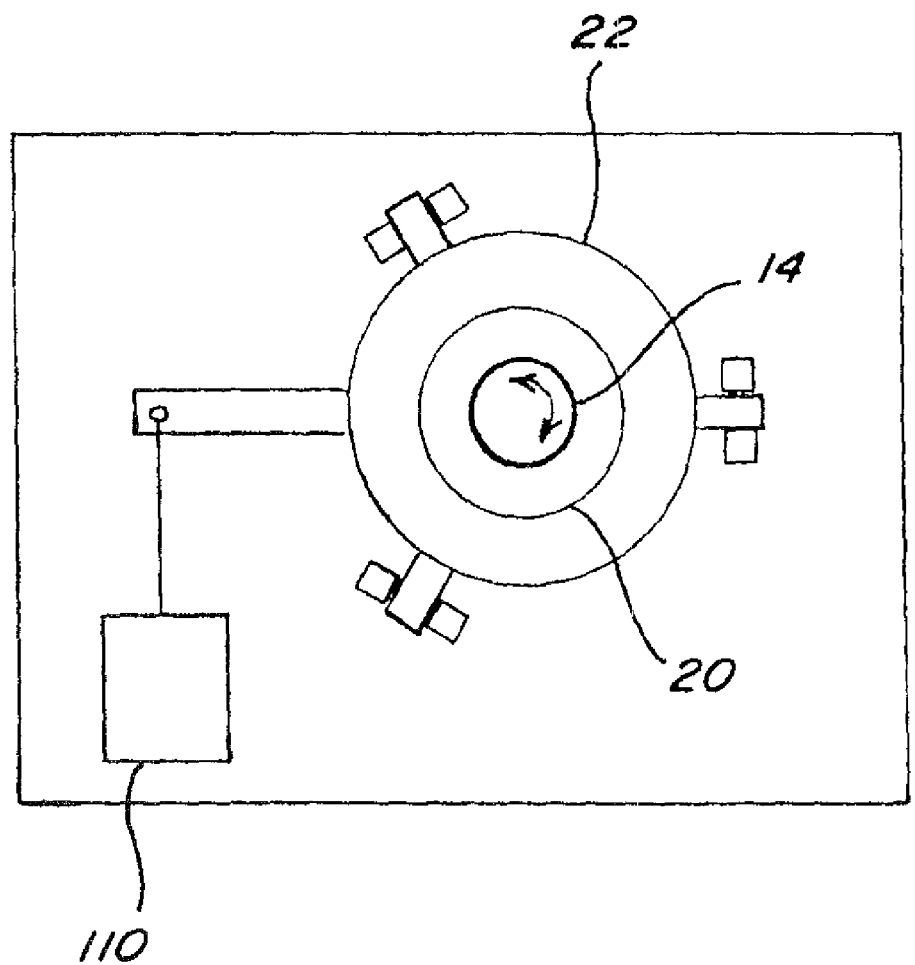
FIG. 5 is a simplified schematic representation of a torque sensor in connection with a workpiece holding fixture for use with the invention.

Referring also to FIG. 4, as noted above, spindle 26 is rotated by a spindle drive 28. Spindle drive can include, for instance, a drive belt powered by a spindle axis 94 including a suitable motor or other drive source. Spindle axis is connected to and controlled by a spindle axis interface 96, also in connection with machine control interface 90 via control bus 92. Control bus 92 additionally connects with a stroker axis interface 98 connected in operative control of servo motor 36 (FIG. 2) which controls the stroking movements of carriage 12, and an operator I/O interface 100. The applied torque from rotation of spindle 26 can be obtained form the operational loads on the motor of spindle axis 94, and outputted from spindle axis interface 96 to feed axis interface 88. For the RUL mode, a rotary transducer 104 is provided in association with spindle 26 for generating applied torque data at that location. The signal from rotary transducer 104 can be fed to machine control interface 90, as denoted by line 106, or fed directly into the feed axis interface, as denoted by line 108. Additionally, referring to FIG. 5, a torque sensor 110 can be provided in association with fixture 22 holding workpiece 20, operable for sensing applied torque loads against the workpiece by rotation of tool 14 therein, and outputting signals to the machine control interface, or the feed axis interface.

The basic rapid advance system of the invention consists of machine control interface 90, spindle axis 94, and feed axis 86. Machine control interface 90 is the main control between all of the axes and I/O. Its main operating function is to monitor all I/O, including any and all transducers, and to monitor and control the drives based on the inputs from the operator and its various sensors.

Rapid Until Force (RUF)

The "Rapid Until Force" (RUF) method of rapid advance of the invention uses an output from a sensor mounted somewhere along the axis of feed rod 74, e.g., load cell 66. This could be located between the drive mechanism and the feed rod or some other means to directly measure the feed rod force. This signal can be fed to machine control interface 90 as denoted by dotted line 112, or directly into the feed axis interface, via cable 82 or other suitable manner of communication. In either case the feed rate is controlled using feedback from the load cell 66 or other sensor to reduce the severity of the impact between the abrasives of honing element 80 and internal surface 24 (FIG. 2) of bore 18 when rapidly expanding honing tool 14.

As noted above, the axial force of wedge 78 to expand honing element or elements 80 is developed from the torque of feed motor 40 and converted to a linear force by ball screw assembly 46 and then transmitted through load cell 66 to rotating feed rod 74 and wedge 78. Load cell 66 therefore always senses the full axial feed force of the honing process.

Figure 6:
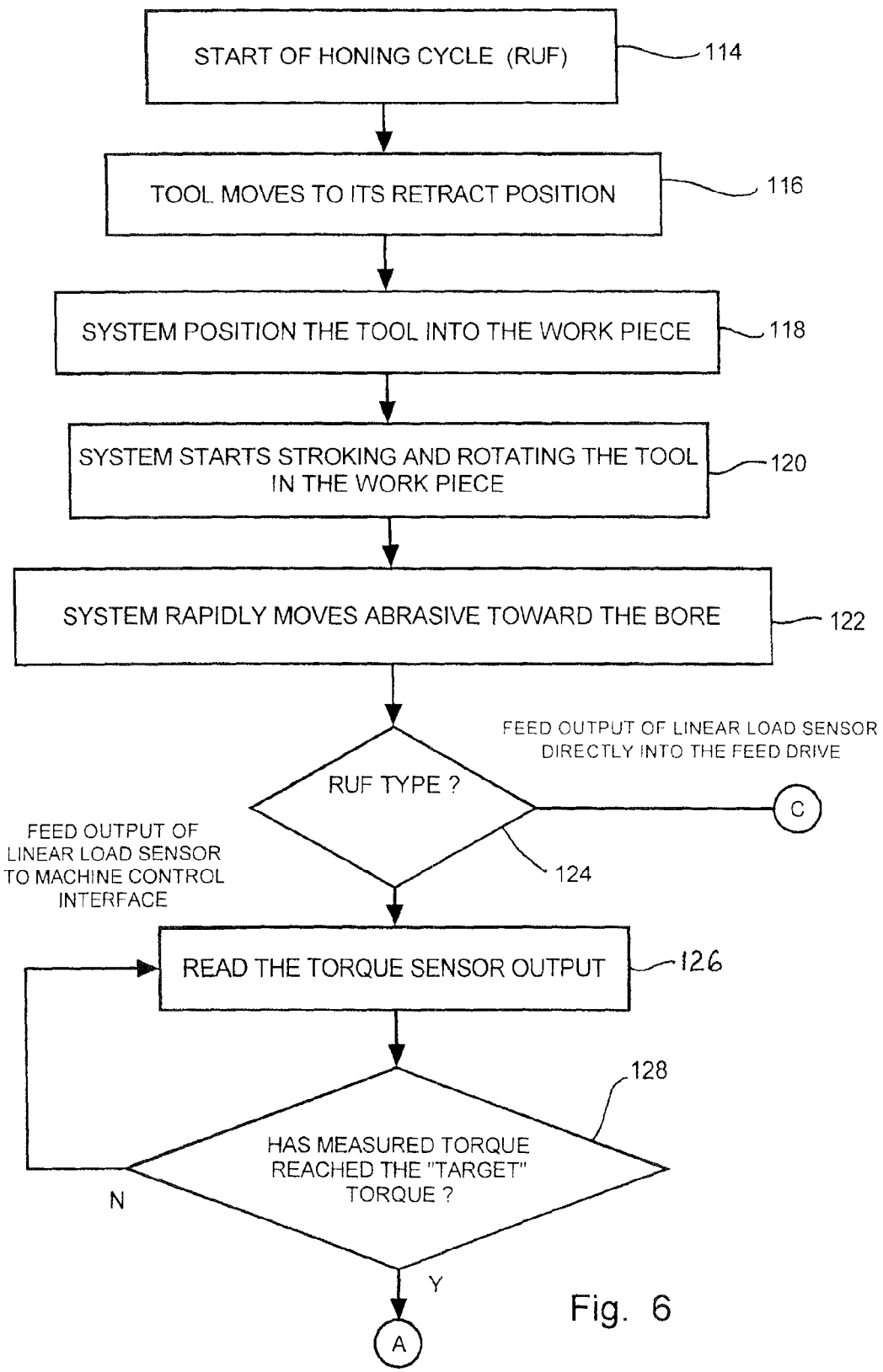
FIG. 6 is a high level flow diagram showing steps of a method of the invention for operation of the feed system in a RUF mode.
Figure 7:
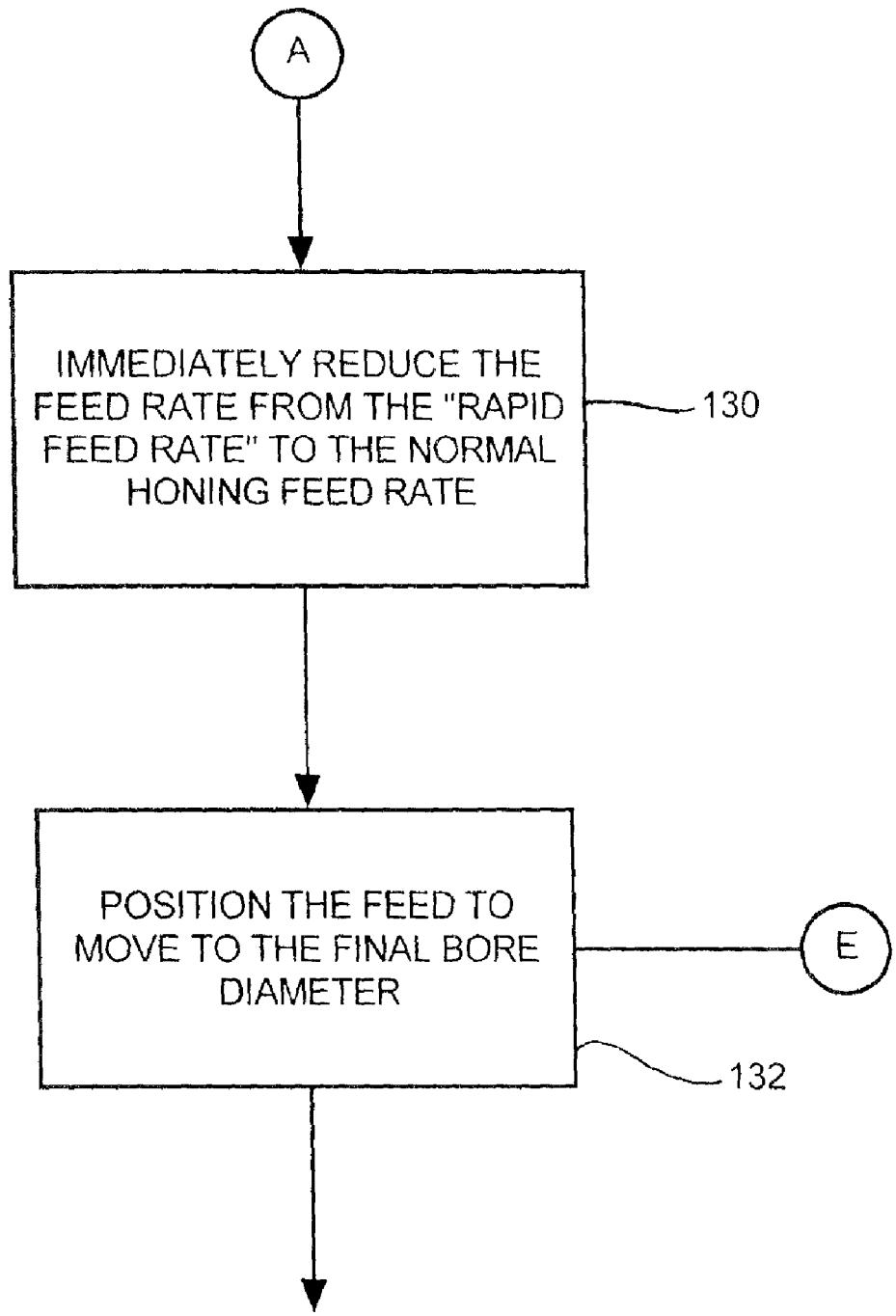
FIG. 7 is a continuation of the diagram of FIG. 6.
Figure 8:
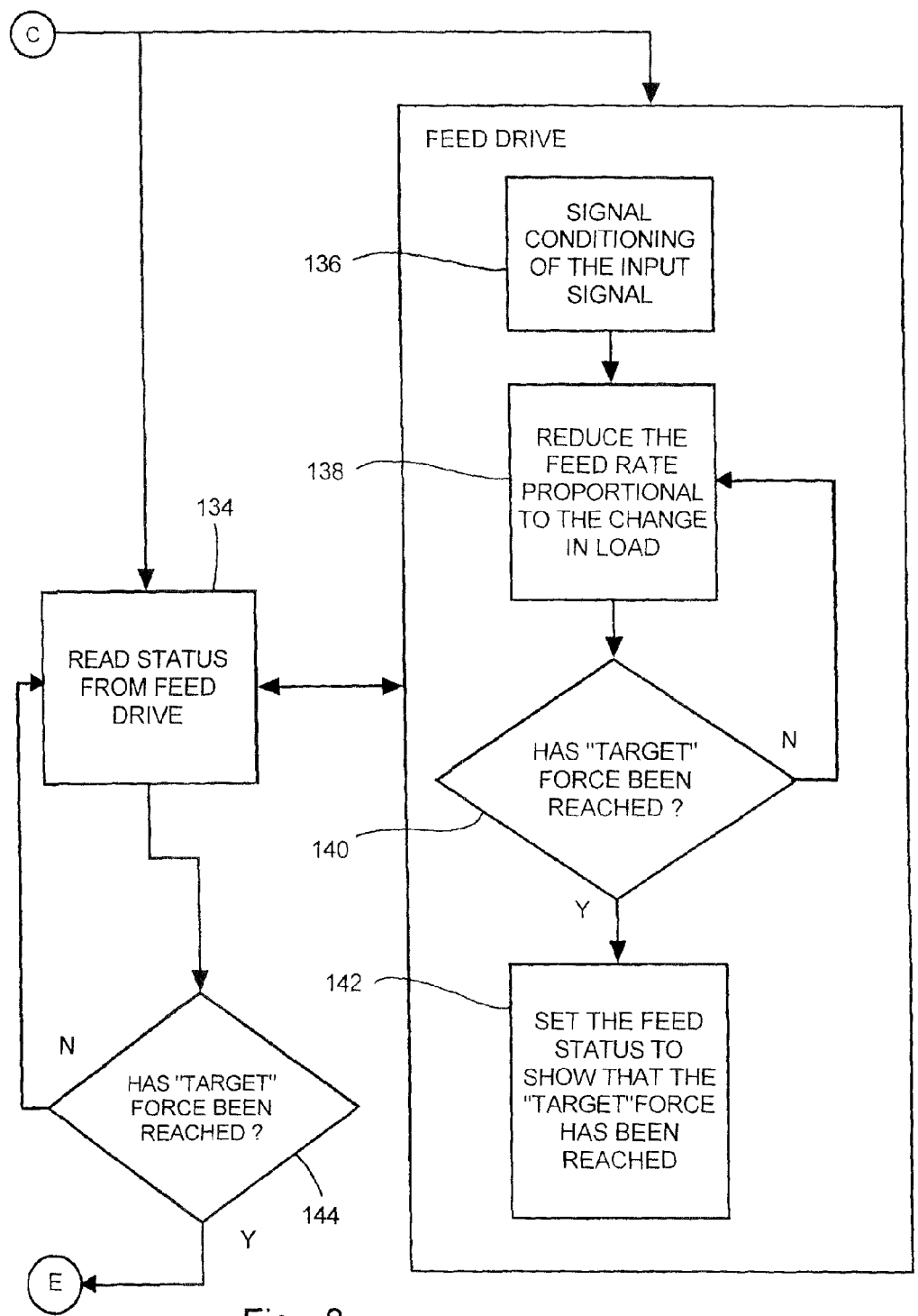
FIG. 8 is another continuation of the diagram of FIG. 6.

Referring also to FIGS. 6, 7 and 8, a flow diagram illustrating the basic machine operation steps according to the invention for implementing a preferred Rapid Until Force method for rapidly advancing the abrasive to the bore at the start of the honing cycle, is shown. In FIG. 6, as a first step, the honing cycle is commenced, as denoted at block 114. This commences movement of the honing tool to its retract position, as denoted at block 116. In block 118, the system next positions the tool into the workpiece, and rotation and stroking is commenced, as shown in block 120. The system now rapidly moves the abrasive toward the bore surface, by rapidly expanding the tool, as denoted at block 122. The next step is a function of whether the output of load cell 66 is fed to machine control interface 90, or feed axis interface 88. If the output is fed to machine control interface 90, the next step is to read the torque sensor output, as denoted at block 126. The system will then monitor the measured torque until the target torque representative of contact between the abrasives and the surface of the bore is reached, as denoted at decision block 128. Referring to FIG. 7, when this occurs, the system will immediately reduce the feed rate from the rapid feed rate to the normal honing feed rate, as denoted at block 130. The tool will then be fed as it is stroked and rotated to achieve the final bore diameter, as denoted at block 132.

Returning to block 124, if the output of load cell 66 is fed to the feed axis interface, the process continues via balloon C, to the sequence of steps of FIG. 8, where the status from the feed drive is read, as denoted at block 134. Within the feed drive, as denoted at block 136, the input signal from load cell 66 is conditioned, as denoted at block 136, and the feed rate is reduced proportional to the change in load, as denoted at block 138. It is then determined whether the target feed force indicative of contact between the abrasives and the bore surface, has been reached, as denoted at decision block 140. If so, the feed status is set to show that the target force has been reached, as denoted at block 142, and this status is outputted to the feed axis interface, which determines that the target force has been reached, as denoted at decision block 144. If, at decision block 140, the target force has not been reached, the feed drive will loop back to block 138, to reduce the feed rate proportional to the change in sensed load, and again determine whether the target force has been reached. Returning to decision block 144, once the system determines that the target force has been reached, it will proceed to block 132 of FIG. 7, via balloon E, to position the feed to move to the final bore diameter.

Rapid Until Load (RUL)

The "Rapid Until Load" (RUL) method of rapid advance preferably uses an output from spindle axis 94, representing the applied torque, and/or a signal from another source, e.g., rotary transducer 104 mounted somewhere along the axis of rotating feed rod 74 (driven by the spindle motor), or torque sensor 110 in connection with the fixture holding the workpiece, as its feedback. This signal can be fed to machine control interface 90 or directly to feed axis interface 88, as denoted by line 102. As explained above, spindle axis 94 drives rotating feed rod 74. The required torque to rotate the honing tool during honing can be monitored by machine control interface 90 by reading the generated torque directly from the spindle drive via control bus 92. An alternative approach is to have the output of the spindle drive feed directly from spindle axis interface 96 to feed axis interface 88, as denoted by line 102. Another approach is to read the applied torque from rotary transducer 104, as fed to machine control interface 90 (via line 106) or feed axis interface 88, via line 108.

Figure 9:
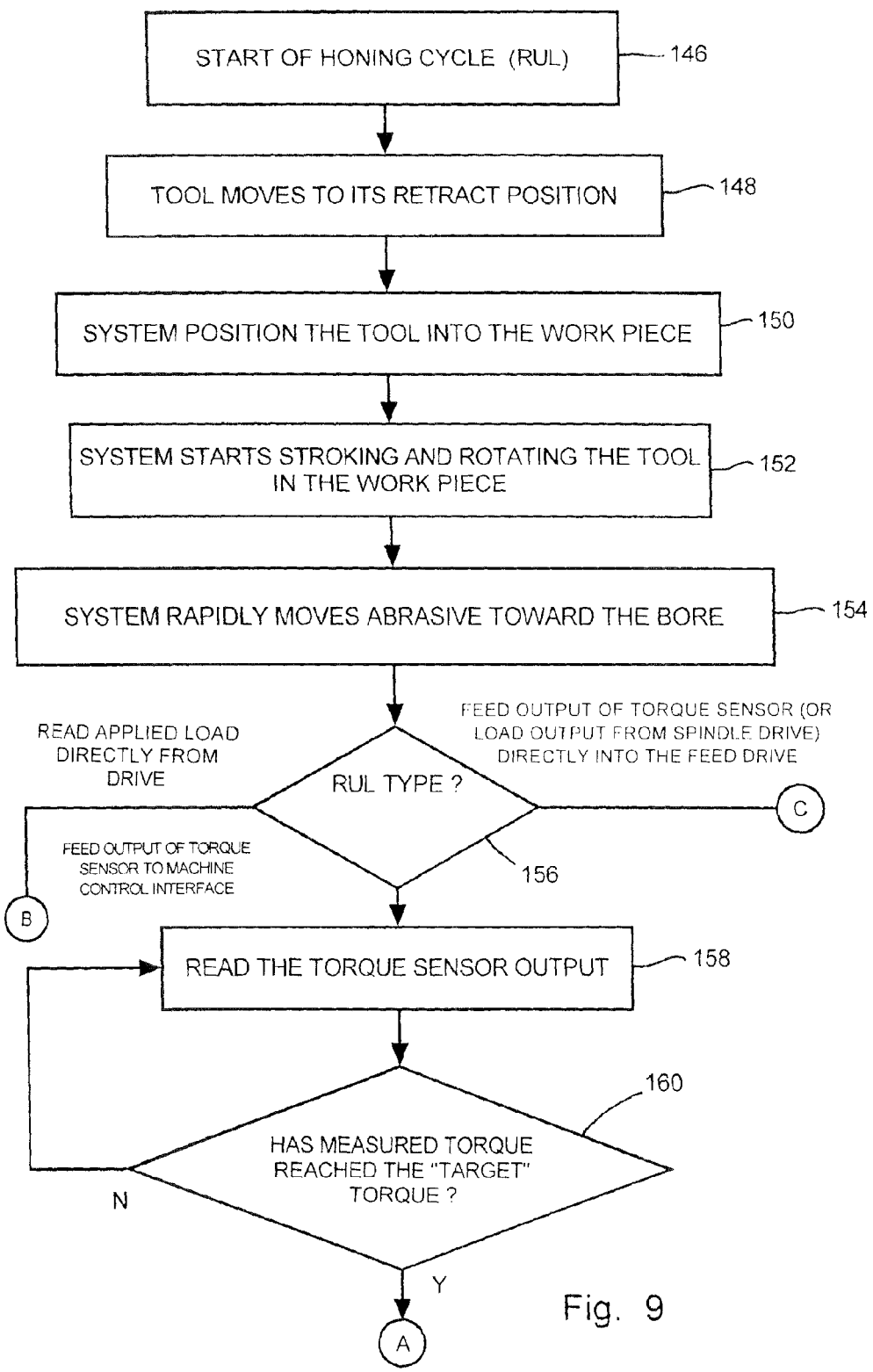
FIG. 9 is a high level flow diagram showing steps of a method of the invention for operation in the RUL mode.

Referring also to FIGS. 9, 10, 11 and 12, a flow diagram illustrating the basic machine operation steps according to the invention for implementing a preferred Rapid Until Load method for rapidly advancing the abrasive to the bore at the start of the honing cycle, is shown. In FIG. 9, as a first step, as in the RUF mode, the honing cycle is commenced, as denoted at block 146. This commences movement of the honing tool to its retract position, as denoted at block 148, and positioning of the tool in the workpiece, as denoted at block 150. The system also starts the stroking and rotation of the tool, as denoted at block 152, and rapidly expands the tool toward the bore surface. The next step is a function of whether torque sensor data is inputted to the machine control interface, or to the feed drive, or the spindle drive load, is used to provide load data, as denoted at decision block 156. If the torque sensor data is fed to the machine control interface, the output of the torque sensor is read, as denoted at block 158, and it is determined if the torque value has reached the target value, as denoted at decision block 160. If so, following balloon A to FIG. 10, the feed rate is immediately reduced from the rapid rate to the normal honing rate, as denoted at block 162. The feed rate used is now the normal rate for honing the workpiece to the final diameter, as denoted at block 164.

Figure 10:
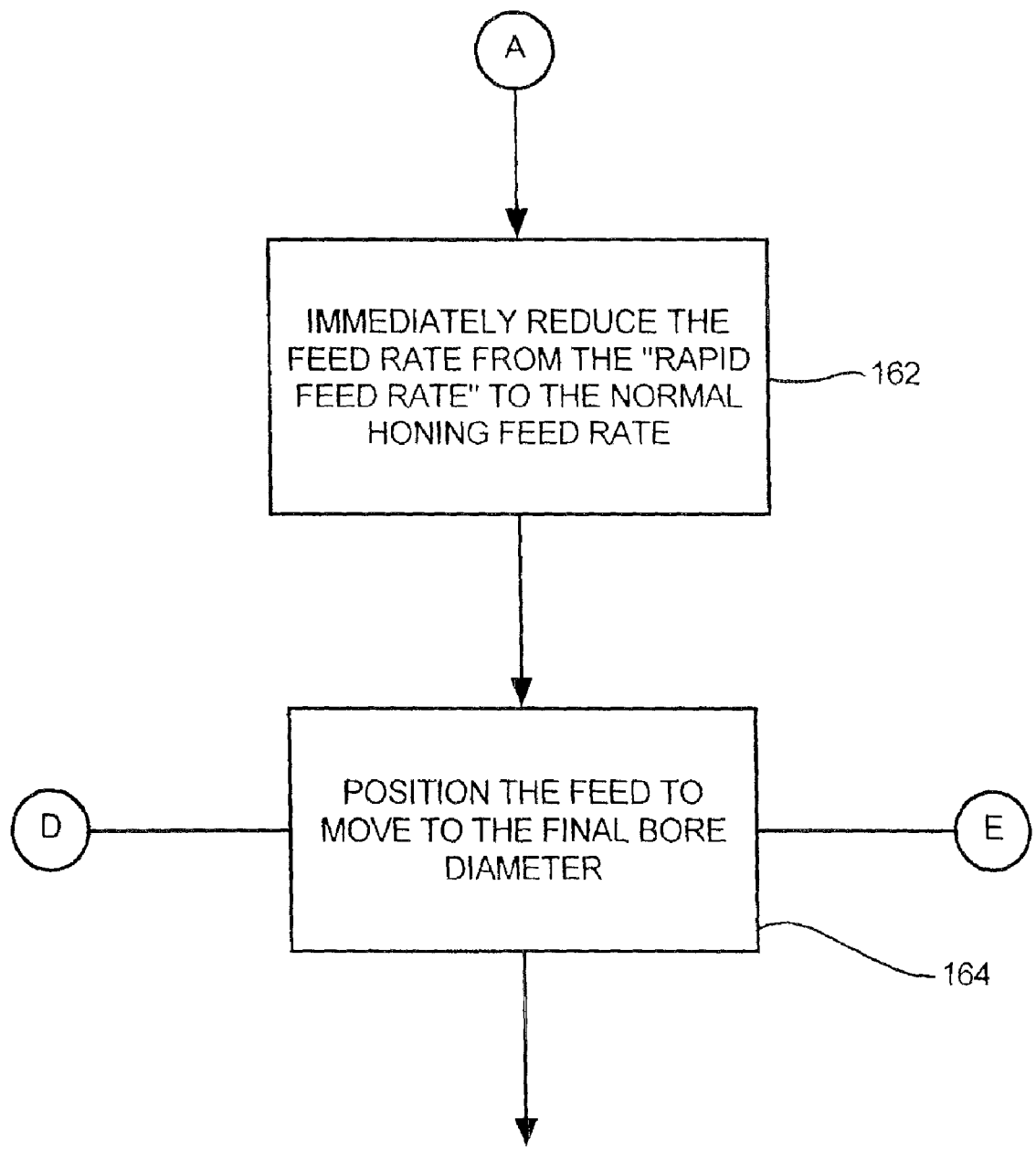
FIG. 10 is a continuation of the diagram of FIG. 9.
Figure 11:
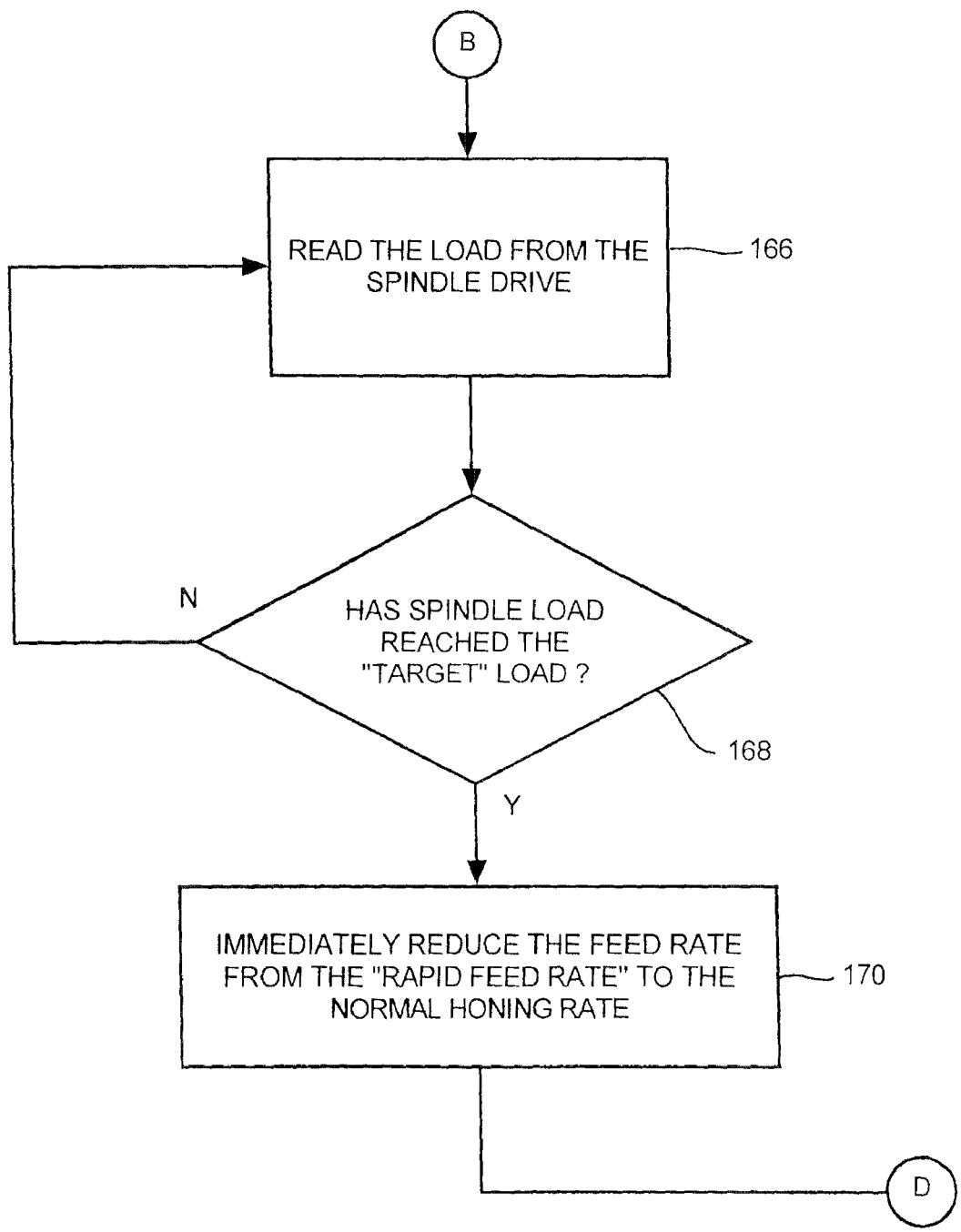
FIG. 11 is another continuation of the diagram of FIG. 9.

Returning to decision block 156, if the spindle drive load is used, following balloon B to FIG. 11, the spindle load value is read as the tool is rapidly expanded to determine if the target load has been reached, as denoted at blocks 166 and 168, and, if so, the feed rate is immediately reduced to the normal honing rate, as denoted at block 170, and following balloon D back to FIG. 10, and the bore is honed to the final diameter, as denoted at block 164.

Figure 12:
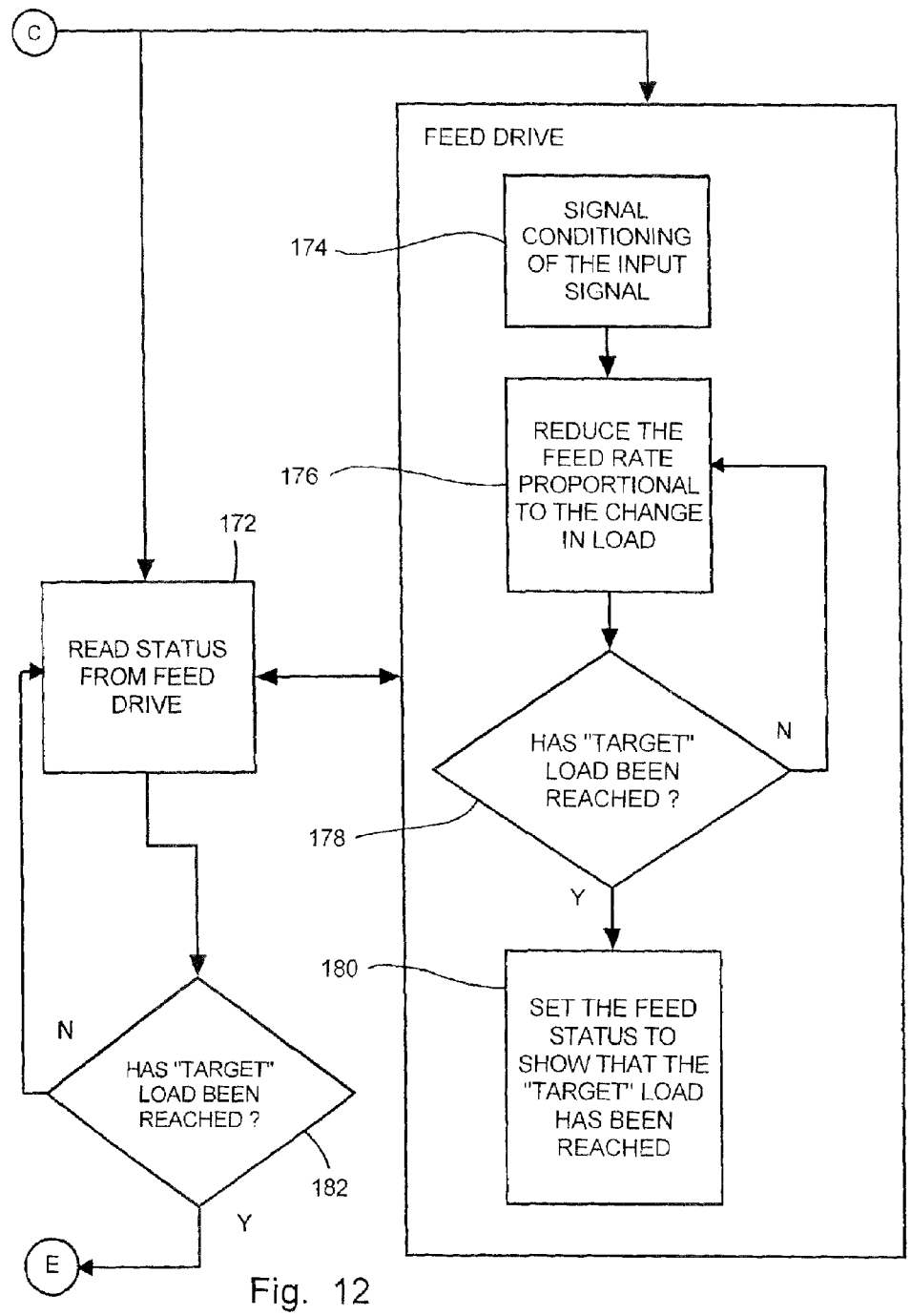
FIG. 12 is another continuation of the diagram of FIG. 9.

Again returning to decision block 156, balloon C can be followed to FIG. 12, for the steps using a data feed from the torque sensor (or the spindle drive load) to the feed drive, as denoted at block 172. Here again, the input signal is conditioned, as denoted at block 174, and the feed rate reduced proportional to the change in load, as denoted at block 176. The load is monitored to determine if the target load has been reached, as denoted at block 178, and, if so, the feed status is set to reflect this, as denoted at block 180. If the target load has not been reached, the feed rate is reduced proportional to the change in load, in a loop with block 176. The status of the feed drive load is monitored in a loop of decision block 182 and block 172, and once the target load is reached, as determined at block 182, following balloon E back to FIG. 10, the feed drive is operated to hone the bore to the final bore diameter, as denoted at block 164.

Addressing signal conditioning according to the invention, an important issue in obtaining a signal that could be used to control the honing process is the amount of noise in the system, compared to the actual signal. The primary source of the noise was found to result from the sensing device, e.g., a load cell, actually moving during the honing process, stroking with the honing tool. Since the stroking motion is cyclic, it was found that a cyclical force can be seen in the signal at the same frequency as the stroking speed. The other sources of noise are electronic noise (primarily DC offsets) as well as other mechanical misalignments. In particular, analyzing the raw data output from a sensor, such as a load cell, it was discovered that the stroking movements generate an inertial force on the sensing device that is really not load that is seen at the honing element. This force is seen at the same frequency as the stroking speed. To eliminate this signal, it was found that one needs to filter out the fundamental frequency (stroking speed). It was also found to be desirable to eliminate the second and possibly third harmonic frequency to achieve a smooth signal. This is done using a $4^{th}$ or a $6^{th}$ order notch filter to eliminate these frequencies. When the stroke is slow, only the $4^{th}$ order filter is used, because if the $6^{th}$ order filter is used, it has been found that there is considerable lag in the system. Once the data is filtered, a fairly smooth output signal is obtained, but other sources of error also need to be addressed to get a true reading from the sensing device.

The other sources of noise or error can be eliminated when first running the machine before the tool comes in contact with the workpiece. To do this, during a very brief period of time at the beginning of the honing cycle, a sample of the filtered load is taken, and the average value that is seen just by running the machine is determined. This averaged value is then subtracted from the filtered load as it is just a DC offset. This offset comes from several sources. A few of these sources can be electronic offsets in the measuring devices as well as mechanical misalignments in the system. By subtracting this baseline force, a much more accurate value with which to control the machine is obtained.

Thus, there has been shown and described a honing feed system and methods, which overcomes many of the problems set forth above. It will be apparent, however, to those familiar in the art, that many changes, variations, modifications, and other uses and applications for the subject system and method are possible. All such changes, variations, modifications, and other uses and applications that do not depart from the spirit and scope of the invention are deemed to be covered by the invention which is limited only by the claims which follow.

What is claimed is:

1. A system for automatically honing a surface of a bore of a workpiece, comprising:
   a honing tool supported on a spindle for rotation about an axis through the tool and for axial stroking movement, the honing tool having at least one radially expandable honing element;
   a feed system in connection with the honing tool, including a movable feed element automatically controllably operable for applying a feed force against the honing tool for radially expanding the at least one honing element;
   a controller including an interface in connection with the feed system automatically operable for controlling operation of the feed system;
   a stroking system operable for axially stroking the honing tool along the axis;
   a drive for rotating the honing tool about the axis;
   a device configured and operable for generating information representative of an initial contact between the at least one honing element and the surface of the bore and outputting a signal representative thereof to the interface;
   the interface and the feed system being configured so as to automatically operate in a sequence including:
   moving the feed element at a first feed rate to radially expand the at least one honing element within the bore of the workpiece while rotating the honing tool and monitoring the signal from the device for presence of the information representative of the initial contact, and when the information representative of the initial contact is present; then immediately automatically reducing the feed rate to a second feed rate less than the first feed rate for honing the surface of the bore.

2. The system of claim 1, wherein the information representative of the initial contact between the at least one honing element and the surface of the bore comprises a linear force condition applied against the movable feed element.

3. The system of claim 2, wherein the device comprises a force transducer disposed in connection with the movable feed element and configured and operable for sensing the linear force condition.

4. The system of claim 1, wherein the information representative of the initial contact between the at least one honing element and the surface of the bore comprises a torque condition.

5. The system of claim 4, wherein the torque condition is generated by the rotation of the honing tool.

6. The system of claim 5, wherein the device comprises a rotary transducer in connection with the movable feed element and configured and operable for sensing the torque condition generated by the rotation of the tool.

7. The system of claim 4, wherein the torque condition is generated by the application of the feed force against the honing tool.

8. The system of claim 4, wherein the torque condition is generated against a fixture holding the workpiece.

9. The system of claim 1, wherein the sequence additionally includes initially operating the device for generating information representative of absence of the contact between the honing element and the surface of the bore and outputting a signal representative thereof to the interface; and wherein the information representative of the initial contact comprises a target torque level greater than a torque level that will be present in the absence of the contact between the honing element and the surface of the bore.

10. The system of claim 9, wherein as the torque level approaches the target torque level, the feed rate will be reduced to a level between the first feed rate and the second feed rate.

11. The system of claim 1, wherein the signal is conditioned to remove or reduce a portion thereof representative of operation of the drive for rotating the honing tool about the axis in absence of contact between the at least one honing element and the surface of the bore.

12. The system of claim 1, wherein the stroking system is operated to stroke the tool while the feed element is moved at the first feed rate to radially expand the at least one honing element within the bore, and the signal is conditioned to remove or reduce a portion of the signal representative of forces generated by the stroking.

13. The system of claim 12, wherein the portion of the signal representative of the forces generated by the stroking include a frequency of the stroking and at least one harmonic frequency thereof.

14. The system of claim 13, wherein the portion of the signal representative of the forces generated by the stroking are filtered using a notch filter.

15. A method for automatically honing a surface of a bore of a workpiece, comprising steps of:
    providing a honing tool supported on a spindle for rotation about an axis through the tool and for axial stroking movement, the honing tool having at least one radially expandable honing element;
    providing a feed system in connection with the honing tool, including a movable feed element automatically controllably operable for applying a feed force against the honing tool for radially expanding the at least one honing element;
    providing a controller including an interface in connection with the feed system automatically operable for controlling operation of the feed system;
    providing a stroking system operable for axially stroking the honing tool along the axis;
    providing a drive for rotating the honing tool about the axis;
    providing a device configured and operable for generating information representative of an initial contact between the at least one honing element and the surface of the bore and outputting a signal representative thereof to the interface;
    operating the feed system for moving the feed element at a first feed rate to radially expand the at least one honing element within the bore of the workpiece while rotating and stroking the honing tool and monitoring the signal from the device for presence of the information representative of the initial contact, including filtering a portion of the signal representative of forces generated by the stroking, and when the information representative of the initial contact is present; then immediately automatically reducing the feed rate to a second feed rate less than the first feed rate for honing the surface of the bore.

16. The method of claim 15, wherein the filtered portion of the signal include a frequency of the stroking and at least one harmonic frequency thereof.

17. The method of claim 15, wherein the portion of the signal is filtered using a notch filter.

18. The method of claim 15, wherein the information representative of the initial contact between the at least one honing element and the surface of the bore comprises a torque.

19. The method of claim 15, wherein the information representative of the initial contact between the at least one honing element and the surface of the bore comprises a force.

20. The method of claim 15, wherein the step of operating the feed system includes filtering a portion of the signal representative of forces generated by the rotation.

21. The method of claim 15, wherein the step of operating the feed system includes filtering a portion of the signal representative of forces generated by moving the feed element for initially expanding the honing element unopposed by the surface of the bore.

* * * * *